(12) United States Patent
Park

(10) Patent No.: US 11,511,324 B2
(45) Date of Patent: Nov. 29, 2022

(54) DRILL DEVICE FOR REMOVING PLUGGING INSIDE PIPE

(71) Applicant: LG CHEM, LTD., Seoul (KR)

(72) Inventor: Jong Hyuk Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 434 days.

(21) Appl. No.: 16/628,527

(22) PCT Filed: Aug. 17, 2018

(86) PCT No.: PCT/KR2018/009457
§ 371 (c)(1),
(2) Date: Jan. 3, 2020

(87) PCT Pub. No.: WO2019/045334
PCT Pub. Date: Mar. 7, 2019

(65) Prior Publication Data
US 2020/0156122 A1 May 21, 2020

(30) Foreign Application Priority Data

Sep. 1, 2017 (KR) .................. 10-2017-0111879
Jul. 30, 2018 (KR) .................. 10-2018-0088263

(51) Int. Cl.
| | |
|---|---|
| *B23B 41/00* | (2006.01) |
| *B08B 9/045* | (2006.01) |
| *B23B 45/00* | (2006.01) |
| *B23B 45/06* | (2006.01) |
| *F16H 1/16* | (2006.01) |

(52) U.S. Cl.
CPC .............. *B08B 9/045* (2013.01); *B23B 41/00* (2013.01); *B23B 45/008* (2013.01); *B23B 45/06* (2013.01); *F16H 1/16* (2013.01); *B23B 2260/07* (2013.01); *B23B 2260/122* (2013.01)

(58) Field of Classification Search
CPC ........ B23B 41/00; E21B 23/001; F16L 55/28; F16H 1/14; F16H 1/16
See application file for complete search history.

(56) References Cited

U.S. PATENT DOCUMENTS

| | | | |
|---|---|---|---|
| 1,705,384 | A | 3/1929 | Wikander |
| 2,786,218 | A | 3/1957 | Yousem |
| 4,419,032 | A | 12/1983 | Flowers |
| 2010/0314129 | A1 | 12/2010 | Fern et al. |
| 2011/0154594 | A1 | 6/2011 | Kozak |
| 2013/0175097 | A1 | 7/2013 | Wardley et al. |
| 2014/0033456 | A1 | 2/2014 | Doty |

FOREIGN PATENT DOCUMENTS

| | | | |
|---|---|---|---|
| CN | 203304625 U | 11/2013 | |
| CN | 206405118 U | 8/2017 | |
| DE | 10145274 A1 | 4/2003 | |
| DE | 112014001451 T5 * | 2/2016 | ............... B25F 3/00 |
| EP | 2378179 B1 | 7/2017 | |
| GB | 1910-23403 | 4/1911 | |
| JP | 53-81986 U | 7/1978 | |

(Continued)

*Primary Examiner* — Alan Snyder
(74) *Attorney, Agent, or Firm* — Dentons US LLP

(57) ABSTRACT

Provided is an apparatus for stably removing plugging even in a state in which combustible gas or liquid remains in a pipe and precisely removing plugging even using small force.

10 Claims, 18 Drawing Sheets

(56) References Cited

FOREIGN PATENT DOCUMENTS

| | | |
|---|---|---|
| JP | 59-195594 U | 12/1984 |
| JP | 6-23334 A | 2/1994 |
| JP | 7-88450 A | 4/1995 |
| JP | 2002-321112 A | 11/2002 |
| JP | 2004116801 A | 4/2004 |
| JP | 2006308174 A | 11/2006 |
| JP | 2009101358 A | 5/2009 |
| JP | 2012197981 A | 10/2012 |
| KR | 1995-0002929 Y1 | 4/1995 |
| KR | 10-0609648 B1 | 8/2006 |
| KR | 10-2013-0013867 A | 2/2013 |

* cited by examiner

12

13

17

DRILL DEVICE FOR REMOVING PLUGGING INSIDE PIPE

CROSS-REFERENCE TO RELATED APPLICATIONS

This application is a national stage of international Application No. PCT/KR2018/009457, filed Aug. 17, 2018, which claims priority from Korean Patent Application No. 10-2017-0111879, filed on Sep. 1, 2017, and Korean Patent Application No. 10-2018-0088263, filed on Jul. 30, 2018, in the Korean Intellectual Property Office, the disclosures of which are incorporated herein by reference in their entirety.

TECHNICAL FIELD

The present invention relates to an apparatus for removing plugging deposited in a pipe, and more specifically, to an apparatus for stably removing plugging in a state in which combustible gas or liquid remains in a pipe.

BACKGROUND ART

A conventional method of removing plugging deposited in a pipe includes, for example, a method of removing deposited plugging by applying impact using a welding rod, etc.

SUMMARY

When a conventional method of removing plugging deposited in a pipe is used, a spark may occur in gas or liquid that remains in the pipe due to generation of static electricity through a welding rod, and thus, there is concern over fire.

When plugging is deposited in a pipe, if plugging is removed in a state in which combustible gas or liquid remains in the pipe, there is concern over an accident such as a fire or an explosion. An object of the present invention is to provide an enhanced apparatus for preventing these accidents and performing an operation in a more stable way, that is, an apparatus for accurately removing plugging in the pipe while removing plugging even with small force and also preventing a spark during a plugging removing operation in the pipe.

In one general aspect, a drill apparatus for removing plugging in a pipe includes:
a drill blade for breaking plugging in the pipe;
a bevel gear and a bevel gear handle, for adjusting an up-and-down motion of the drill blade;
a worm gear and a worm gear handle, for adjusting a rotation motion of the drill blade;
a screw positioned on the same axis line as the drill blade and having an outer surface shaped like a male thread;
a drill shaft including a first part surrounding the screw and a second part with the drill blade fixed thereto, an internal surface of the first part being shaped like a female thread engaged with the male thread of the screw; and
a shaft guide surrounding the first part of the drill shaft to contact the drill shaft.

In the drill apparatus for removing plugging in a pipe, the bevel gear may include a first bevel gear member coupled to the bevel gear handle, and a second bevel gear member engaged with the first bevel gear member;
the drill apparatus may further include a bevel gear shaft for connecting the second bevel gear member and a lower end portion of the screw;

by rotation of the bevel gear handle, the first bevel gear member may be rotated, the second bevel gear member may be engaged with the first bevel gear member and is rotated, the bevel gear shaft coupled to the second bevel gear member may be rotated, and the screw coupled to the bevel gear shaft may be rotated; and by rotation of the screw, an internal surface of the drill shaft shaped like a female thread may be engaged with an outer surface of the screw shaped like a male thread, the drill blade may be moved in an up and down direction while being rotated, and the drill blade fixed to the drill shaft may be moved in an up and down direction.

In the drill apparatus for removing plugging in a pipe,
the worm gear may include a first worm gear member coupled to the worm gear handle, and a second worm gear member engaged with the first worm gear member;
the drill apparatus may include a fixing plate connected to a lower portion of the shaft guide and contacting the second worm gear member; and by rotation of the worm gear handle in one direction, the first worm gear member may be rotated and the second gear member is rotated, the fixing plate contacts the second worm gear member to rotate the fixing plate, the shaft guide coupled to the fixing plate may be rotated, the drill shaft contacts the shaft guide and may be rotated, and the drill blade fixed to the drill shaft may be rotated.

In the drill apparatus for removing plugging in a pipe,
the second worm gear member may be moved away from the fixing plate by rotation of the worm gear handle in the other direction, and only power from rotation of the bevel gear handle is transferred to the drill shaft.

In the drill apparatus for removing plugging in a pipe, the drill blade may be formed of a bronze material.

The drill apparatus for removing plugging in a pipe may further include a body casing surrounding the shaft guide and an upper casing member for containing plugging that is fallen downward during an operation of removing plugging via the drill blade, the upper casing member being coupled to the body casing.

The drill apparatus may further include:
a flexible wire for connecting the drill blade and the second part of the drill shaft; and
a flexible high-pressure hose for connecting the upper casing member and the pipe and surrounding the flexible wire,
wherein an operation of removing plugging in the pipe may be easily performed even in a narrow space via the flexible high-pressure hose and the flexible wire.

The drill apparatus may further include a V packing and a packing nut, positioned in the upper casing member and surrounding the second part of the drill shaft, wherein when the drill blade is moved, an upper portion of the body casing may be sealed by compressing the V packing via the packing nut to prevent the plugging contained in the upper casing member from being moved into the body casing.

In the drill apparatus for removing plugging in a pipe,
the upper casing member may include an opening disposed in a lateral surface thereof, and an upper casing member connection pipe and a valve are connected to the opening; and
nitrogen gas may be supplied into the upper casing member through the upper casing member connection pipe to prevent fire or explosion due to a spark when plugging is broken by the drill blade, or
plugging in the upper casing member may be externally discharged through the upper casing member connection pipe.

In the drill apparatus for removing plugging in a pipe, the flexible high-pressure hose may be replaceable with a nipple, the nipple connects the drill apparatus and the pipe, and the drill blade may be connectable directly to the second part of the drill shaft without the flexible wire.

According to the present invention, when plugging in a pipe is removed, even if plugging is removed in a state in which combustible gas or liquid remains in the pipe, it may be advantageous in that an accident such as a fire or an explosion is prevented and an operation is performed using a more stable method. In addition, it may be advantageous that the apparatus accurately removes plugging in the pipe while removing plugging even with small force and also prevents a spark during a plugging removing operation in the pipe.

DETAILED DESCRIPTION

Figure 1A:
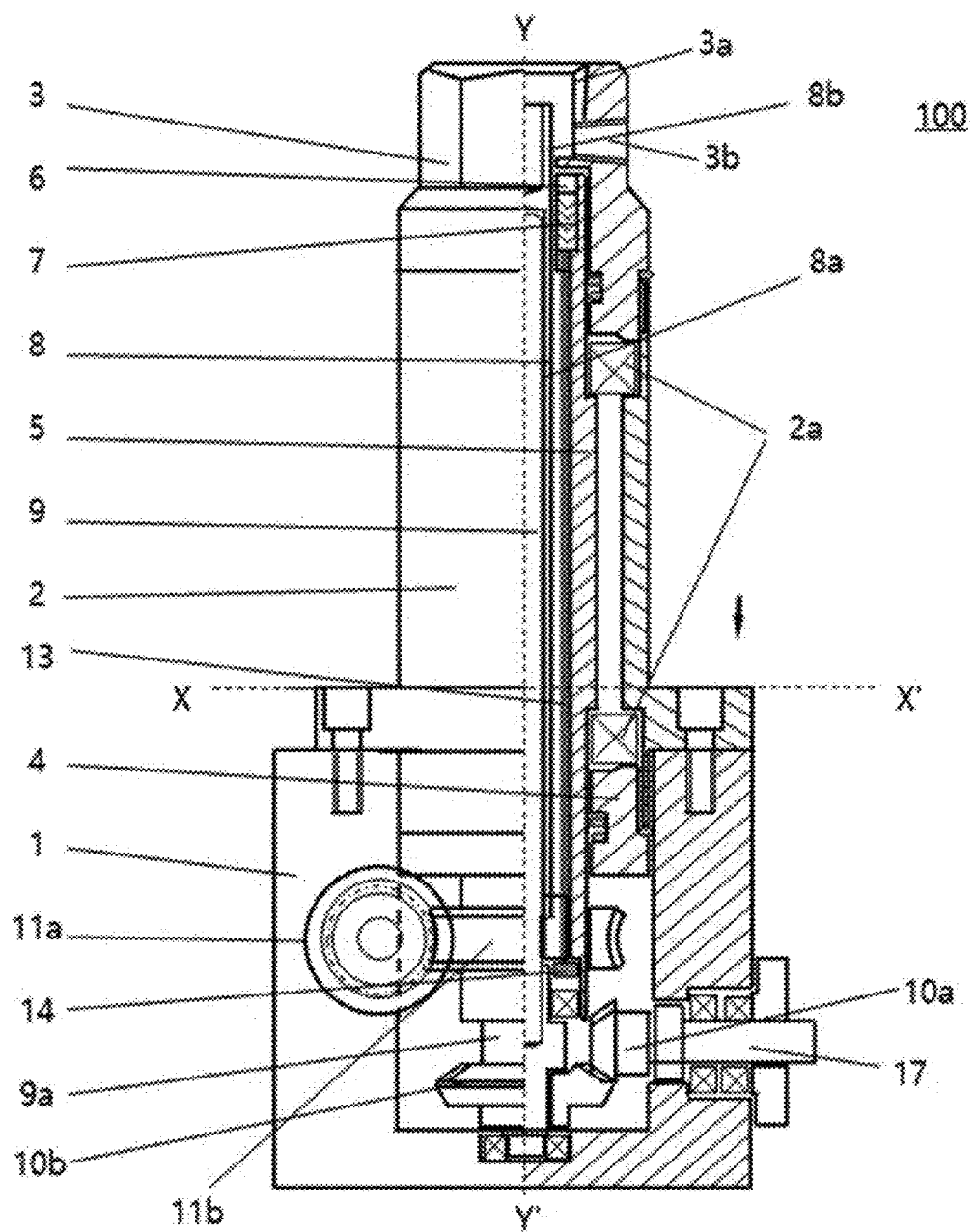
FIGS. 1A and 1B are diagrams of a drill apparatus and a gear box of the drill apparatus according to the present invention.

In one general aspect, a drill apparatus for removing plugging in a pipe includes:

a drill blade for breaking plugging in the pipe;

a bevel gear and a bevel gear handle, for adjusting an up-and-down motion of the drill blade;

a worm gear and a worm gear handle, for adjusting a rotation motion of the drill blade;

a screw positioned on the same axis line as the drill blade and having an outer surface shaped like a male thread;

a drill shaft including a first part surrounding the screw and a second part with the drill blade fixed thereto, an internal surface of the first part being shaped like a female thread engaged with the male thread of the screw; and a shaft guide surrounding the first part of the drill shaft to contact the drill shaft.

In the drill apparatus for removing plugging in a pipe, the bevel gear may include a first bevel gear member coupled to the bevel gear handle, and a second bevel gear member engaged with the first bevel gear member;

the drill apparatus may further include a bevel gear shaft for connecting the second bevel gear member and a lower end portion of the screw;

by rotation of the bevel gear handle, the first bevel gear member may be rotated, the second bevel gear member may be engaged with the first bevel gear member and is rotated, the bevel gear shaft coupled to the second bevel gear member may be rotated, and the screw coupled to the bevel gear shaft may be rotated; and by rotation of the screw, an internal surface of the drill shaft shaped like a female thread may be engaged with an outer surface of the screw shaped like a male thread, the drill shaft may be moved in an up and down direction while being rotated, and the drill blade fixed to the drill shaft may be moved in an up and down direction.

In the drill apparatus for removing plugging in a pipe, the worm gear may include a first worm gear member coupled to the worm gear handle, and a second worm gear member engaged with the first worm gear member;

the drill apparatus may include a fixing plate connected to a lower portion of the shaft guide and contacting the second worm gear member; and by rotation of the worm gear handle in one direction, the first worm gear member may be rotated and the second gear member may be rotated, the fixing plate contacts the second worm gear member may be rotated, the shaft guide coupled to the fixing plate may be rotated, the drill shaft contacts the shaft guide may be rotated, and the drill blade fixed to the drill shaft may be rotated.

In the drill apparatus for removing plugging in a pipe, the second worm gear member may be moved away from the fixing plate by rotation of the worm gear handle in the other direction, and only power from rotation of the bevel gear handle is transferred to the drill shaft.

In the drill apparatus for removing plugging in a pipe, the drill blade may be formed of a bronze material.

The drill apparatus for removing plugging in a pipe may further include a body casing surrounding the shaft guide and an upper casing member for containing plugging that is fallen downward during an operation of removing plugging via the drill blade, the upper casing member being coupled to the body casing.

The drill apparatus may further include:

a flexible wire for connecting the drill blade and the second part of the drill shaft; and a flexible high-pressure hose for connecting the upper casing member and the pipe and surrounding the flexible wire, wherein an operation of removing plugging in the pipe may be easily performed even in a narrow space via the flexible high-pressure hose and the flexible wire.

The drill apparatus may further include a V packing and a packing nut, positioned in the upper casing member and surrounding the second part of the drill shaft, wherein when the drill blade is moved, an upper portion of the body casing may be sealed by compressing the V packing via the packing nut to prevent the plugging contained in the upper casing member from being moved into the body casing.

In the drill apparatus for removing plugging in a pipe, the upper casing member may include an opening disposed in a lateral surface thereof, and an upper casing member connection pipe and a valve are connected to the opening; and nitrogen gas may be supplied into the upper casing member through the upper casing member connection pipe to prevent fire or explosion due to a spark when plugging is broken by the drill blade, or plugging in the upper casing member may be externally discharged through the upper casing member connection pipe.

In the drill apparatus for removing plugging in a pipe, the flexible high-pressure hose may be replaceable with a nipple, the nipple connects the drill apparatus and the pipe, and the drill blade may be connectable directly to the second part of the drill shaft without the flexible wire.

Hereinafter, a drill apparatus according to an embodiment of the present invention is described in detail. The accompanying drawings are only an example, and thus it should not be construed as limiting the protection scope of the present invention which is obvious from the claims and throughout the specification.

Irrespective of the number of drawings, the same or corresponding elements are denoted by the same reference numerals, and a repeated explanation thereof will not be given, and in the drawings, sizes and shapes of components may be exaggerated and reduced for clarity.

FIG. 1A is a front view of a drill apparatus 100 and a cross-sectional view of components of a drill apparatus 100 according to an embodiment of the present invention. Based on a dotted line Y-Y' across the center of the drill apparatus 100, a right portion is an internal cross-sectional view of the drill apparatus 100, and a left portion is a front view, viewed from the outside of the drill apparatus 100, and an internal cross-sectional view of some components of a gear box 1 to be described below.

An outer part of the drill apparatus 100 may include the gear box 1 and a body casing 2, and the gear box 1 and the body casing 2 may be detachably coupled to each other. An upper casing member 3 may be coupled to an upper portion of the body casing 2, and a lower casing member 4 may be coupled to a lower portion of the body casing 2.

Referring to the internal cross-sectional view of the drill apparatus 100, a ball bearing 2a may be disposed inside the body casing 2 of the drill apparatus 100 and at a lower end of the upper casing member 3, and the ball bearing 2a may be disposed inside the body casing 2 and at an upper end of the lower casing member 4. A sleeve 5 may be disposed inside the body casing 2 to contact the ball bearing 2a. A drill shaft 8 may be disposed inside the sleeve 5. The drill shaft 8 may include a first part 8a including a screw 9 disposed therein and a second part 8b for fixing a drill blade 12 to be described below, and a lower end portion (refer to the right portion of FIG. 1A) of the first part 8a of the drill shaft 8 may be coupled to worm gear members 11a and 11b to be described below.

A bevel gear shaft 9a may be coupled to a lower end portion of the screw 9. A bevel gear 10 may be coupled to a lower end portion of the bevel gear shaft 9a. The bevel gear 10 may include a first bevel gear member 10a and a second bevel gear member 10b engaged with the first bevel gear member 10a. A bevel gear handle 17 may be coupled to the first bevel gear member 10a. The second bevel gear member 10b may be coupled to the screw 9 through the bevel gear shaft 9a. That is, the bevel gear shaft 9a may be coupled to the second bevel gear member 10b, and the screw 9 may be coupled to the bevel gear shaft 9a. The bevel gear handle 17, the bevel gear 10, and the bevel gear shaft 9a may be mounted in the gear box 1.

A rotation axis of the bevel gear handle 17 may be perpendicular to a direction in which the screw 9 extends (i.e., a rotation axis of a screw). When the bevel gear handle 17 is turned in one direction, the first bevel gear member 10a coupled to the bevel gear handle 17 may be rotated together, the second bevel gear member 10b engaged with the first bevel gear member 10a may be rotated together, the bevel gear shaft 9a engaged with the second bevel gear member 10b may also be rotated together, and the screw 9 coupled to the bevel gear shaft 9a may also be rotated together.

An outer surface of the screw 9 may be shaped like a male thread, an internal wall of the first part 8a of the drill shaft 8 may be shaped like a female thread corresponding to the shape of the male thread of the screw 9, and accordingly, the outer surface of the screw 9 and the internal wall of the first part 8a of the drill shaft 8 may be engaged with each other. Accordingly, when the screw 9 is rotated according to a rotation motion of the bevel gear handle 17, the drill shaft 8 may be moved forward while the internal surface of the first part 8a of the drill shaft 8, which is engaged with the outer surface of the shape of the male thread of the screw 9, is moved along with the outer surface of the screw 9 shaped like a male thread. In this case, the drill shaft 8 may be moved forward based on an interval of a screw thread. For example, the drill shaft 8 may be moved forward on a screw thread interval basis, e.g., 1.25 mm per one revolution. When the drill shaft 8 is moved forward, the drill blade 12 to be coupled to the second part 8b of the drill shaft 8 may be moved to a position of a pipe, in which plugging is deposited. When the bevel gear handle 17 is turned in an opposite direction, power may be transmitted to the same components to move the drill shaft 8 backward, as described above.

When a length of the drill apparatus 1 is embodied as, for example, 273 mm to the bevel gear handle 17 from the upper casing member 3 to be described below, a stroke of an up-and-down motion by the screw 9 may be, for example, 135 mm to 140 mm. However, the present invention is not limited thereto, and thus, a stroke of the screw 9 may be adjustable according to an environment of a process line in which the present invention is embodied, and when a size or a shape of the drill apparatus 100 is modified and changed, the drill apparatus 100 may be modified and changed in various forms, for example, the stroke of the screw 9 may be accordingly adjusted and embodied.

As shown in FIG. 1A, the first part 8a of the drill shaft 8 may surround the screw 9, and the drill blade 12 may be fixedly inserted into the second part 8b of the drill shaft 8. In this case, a small groove (not shown) may be formed in the second part 8b of the drill shaft 8 and a convex portion (not shown) may be formed on the drill blade 12, and thus, the groove of the second part 8b of the drill shaft 8 and the convex portion of the drill blade 12 may be coupled to each other such that the drill blade 12 is fixed to the second part 8b of the drill shaft 8. Accordingly, even if a worm gear handle 18 to be described below is turned to rotate the drill shaft 8 and the drill blade 12 coupled to the drill shaft 8 is rotated, an operator may safely work on an operation without separation of the drill blade 12 from the drill apparatus 100. Such a fixing method is not limited to the above description of the present invention and may be changed in various forms.

When the bevel gear handle 17 is turned to allow the drill blade 12 to contact a position desired by an operator, the operator may turn the worm gear handle 18 to rotate the drill blade 12. In detail, the worm gear handle 18 may be coupled and fixed to a first worm gear member 11a of a worm gear 11. A second worm gear member 11b may be engaged with the first worm gear member 11a. When the worm gear handle 18 is turned, the first worm gear member 11a may be rotated and the second worm gear member 11b may be rotated while being engaged with the first worm gear member 11a. For example, when the worm gear handle 18 is turned clockwise, the second worm gear member 11b may be rotated, and a fixing plate 14 may contact the second worm gear member 11b. Accordingly, in conjunction with rotation of the second worm gear member 11b, the fixing plate 14 may also be rotated. In addition, a shaft guide 13 coupled to the fixing plate 14 may also be rotated together. Because the shaft guide 13 surrounds the drill shaft 8 and contacts the drill shaft 8, the drill shaft 8 that contacts the shaft guide 13 may also be rotated together according to rotation of the shaft guide 13. The drill blade 12 coupled to the second part 8b of the drill shaft 8 may also be rotated together. In other words, when the worm gear handle 18 is turned, the first worm gear member 11a may be rotated, the second worm gear member 11b may be rotated while being engaged with the first worm gear member 11a, the fixing plate 14 that contacts the second worm gear member 11b and the shaft guide 13 may be rotated in conjunction with the second worm gear member 11b, the drill shaft 8 may be rotated by rotation force of the shaft guide 13, and the drill blade 12 fixed to the drill shaft 8 may get stuck in plugging in a pipe and may break the plugging while being rotated.

In this case, while the drill shaft 8 is rotated, the sleeve 5 may also be rotated, and the ball bearings 2a disposed between the sleeve 5 and the body casing 2 may buffer impact toward the body casing 2 due to rotation of the sleeve 5, the shaft guide 13, and the drill blade 12.

For example, when the worm gear handle 18 is turned counterclockwise, the second worm gear member 11b may be rotated in an opposite direction to that in the aforementioned case and the second worm gear member 11b may be moved away from the fixing plate 14, and thus, the fixing plate 14 and the drill shaft 8 may not be rotated. That is, the fixing plate 14 and the drill shaft 8 may become in a sort of a gear neutral state. In this case, the drill shaft 8 may not be affected by the worm gear handle 18 and the worm gear 11, and thus, may be affected only by an up-and-down motion due to rotation of the bevel gear handle 17 and the bevel gear 10. Accordingly, when an operator intends to adjust a position of the drill blade 12 in an up and down direction during a plugging removing operation, the worm gear handle 18 may be turned counterclockwise by a predetermined number of rotation times to move the worm gear 11 away from the fixing plate 14, and then, the bevel gear handle 17 may be turned to adjust positions of the drill shaft 8 and the drill blade 12 in an up and down direction.

For example, although the case in which, when the worm gear handle 18 is turned clockwise, the drill shaft 8 and the drill blade 12 are rotated, and when the worm gear handle 18 is turned clockwise, the worm gear 11 is moved away from the fixing plate 14 and becomes in a sort of a gear neutral state is described, the present invention is not limited to the above description, may be embodied in a completely opposite manner, and may be modified and changed in various ways according to a situation.

Figure 4A:
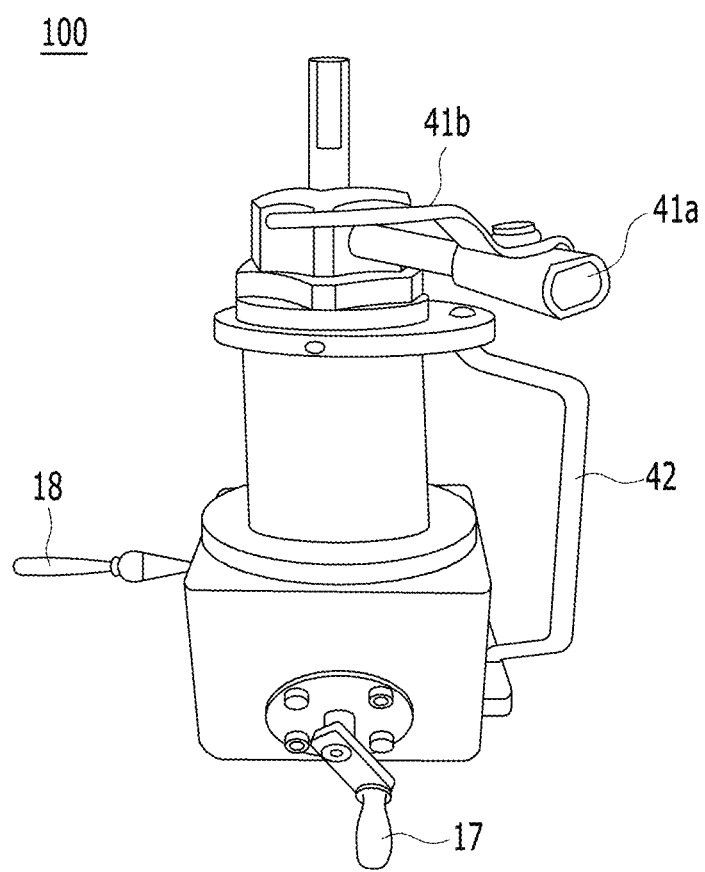
FIG. 4A is an image showing a drill apparatus according to an embodiment of the present invention.

Plugging in a pipe may be present in an environment with high temperature and pressure. Accordingly, the broken plugging may hurt an operator while being separated. Referring back to FIG. 1A, the drill apparatus 100 may include the upper casing member 3 coupled to an upper portion of the body casing 2, and thus, even if the broken plugging is fallen downward, the plugging may be contained in the upper casing member 3. The upper casing member 3 may include a V packing 7 and a packing nut 6 which are disposed therein and are described below. A groove 3a for coupling a nipple 33 shown in FIG. 4D or a flexible high-pressure hose 31 shown in FIG. 4B, which is described below, may be disposed on an internal surface of the upper casing member 3. In addition, an opening 3b may be disposed in a portion of a lateral surface of the upper casing member 3, and thus, as shown in FIG. 4A, an upper casing member connection pipe 41a and a valve 41b may be connected to each other, and during an operation, the valve 41b may be open to also discharge plugging contained in the upper casing member 3 out of the drill apparatus 100 through the upper casing member connection pipe 41a. As necessary, an extension pipe may be connected to the upper casing member connection pipe 41a and plugging may be discharged, and thus, plugging may not contact an operator.

The V packing 7 may be disposed between the drill shaft 8 and the sleeve 5 at a position at which the shaft guide 13 is ended in an upper portion of an internal wall of the sleeve 5, the V packing 7 may surround the drill shaft 8, and the packing nut 6 may be disposed at an upper end of the V packing 7, as shown in FIG. 1A. The V packing 7 may be formed of, for example, a Teflon material, and the packing nut 6 may be formed of, for example, a stainless steel material. Accordingly, when the drill blade 12 is moved, a load may be applied to the packing nut 6 downward, the V packing 7 formed of a Teflon material and having a small amount of elasticity may be compressed, and the compressed V packing 7 may expand in a perpendicular direction to a direction in which the V packing 7 is compressed, and thus, the body casing 2 may be sealed to prevent plugging contained in the upper casing member 3 from being moved into the sleeve 5 or the body casing 2 even if the drill blade 12 is moved. When connecting the upper casing member connection pipe 41a to the opening 3b of the upper casing member 3 to discharge plugging, the V packing 7 may prevent pressure inside the upper casing member connection pipe 41a from being transferred into the gear box 1, and thus, an operation of gears installed in the gear box 1 may not be affected.

Figure 1B:
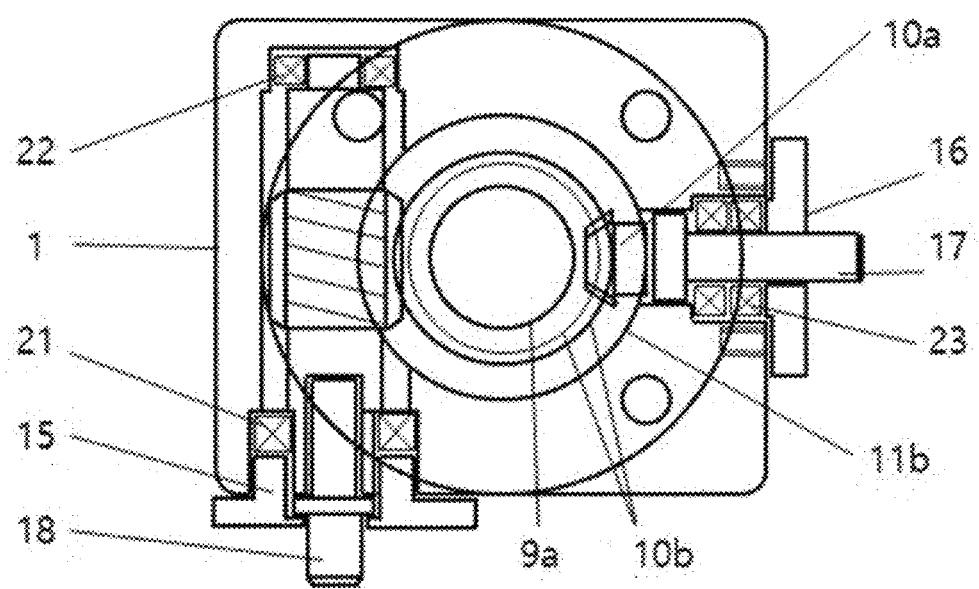
Figure 2A:
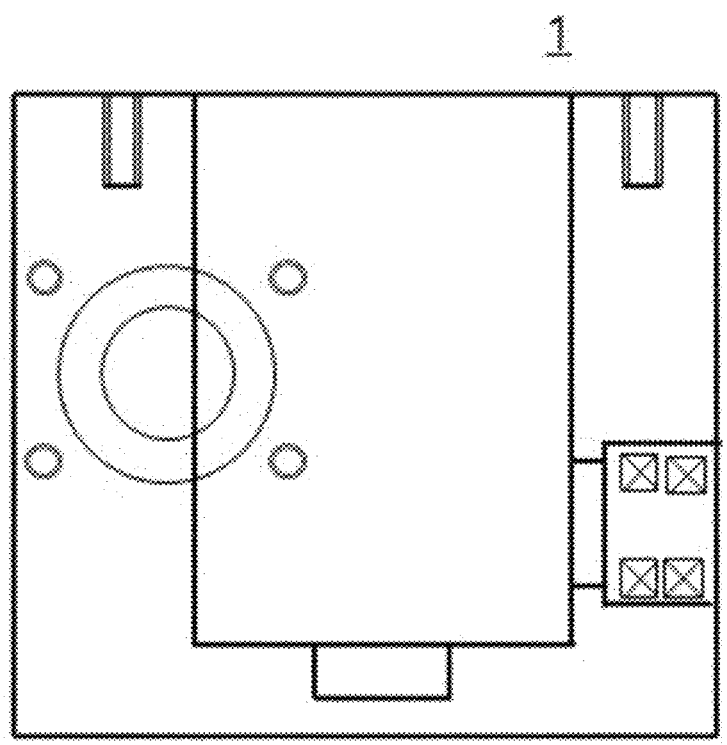
FIGS. 2A to 2M are diagrams showing components of the drill apparatus of FIG. 1A, respectively.
Figure 2B:
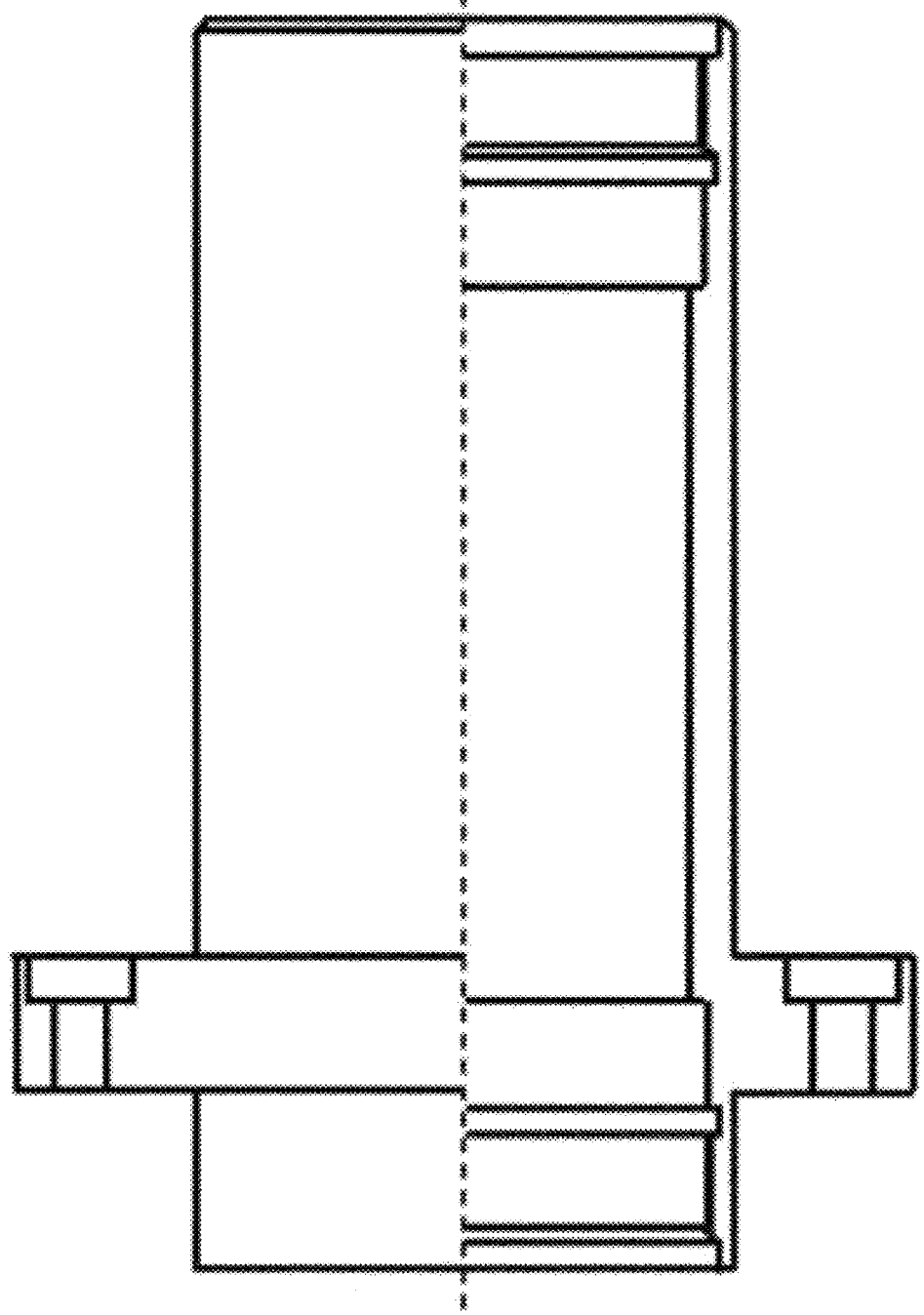
Figure 2C:
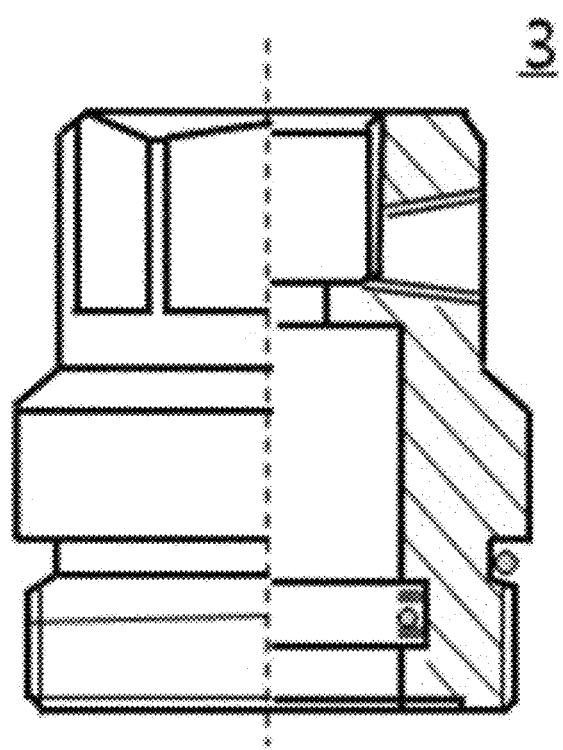
Figure 2D:
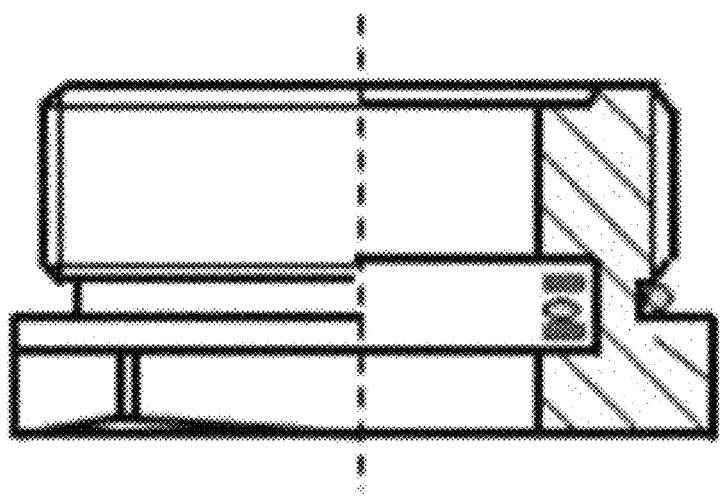
Figure 2E:
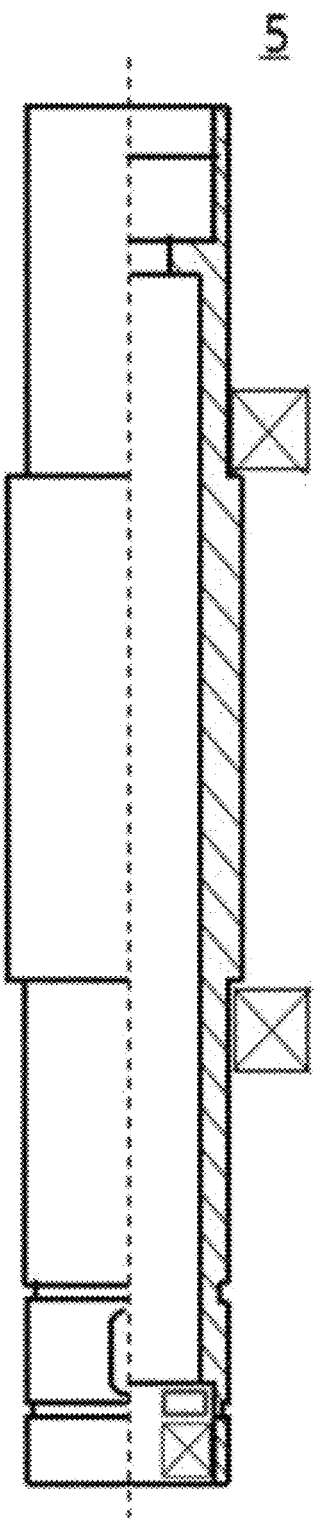
Figure 2F:
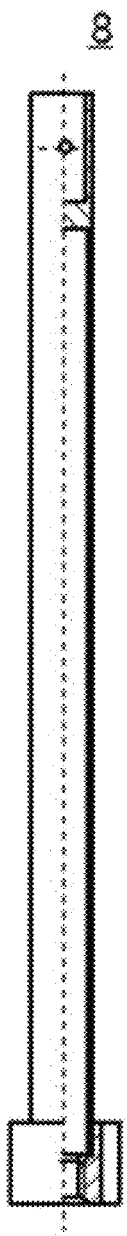
Figure 2G:
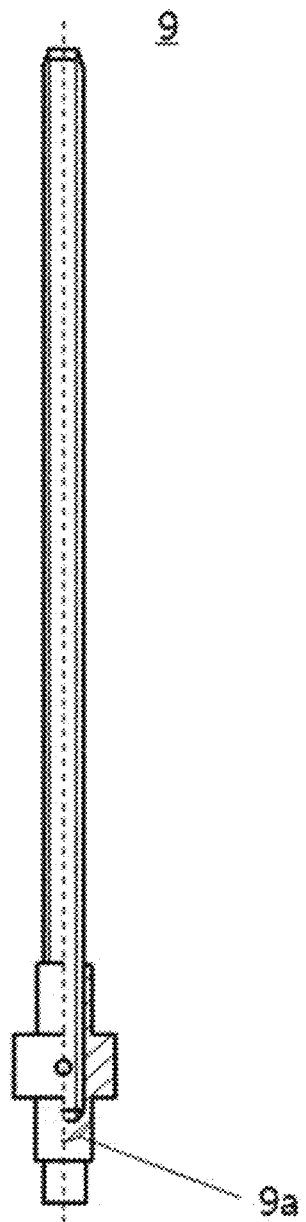
Figure 2H:
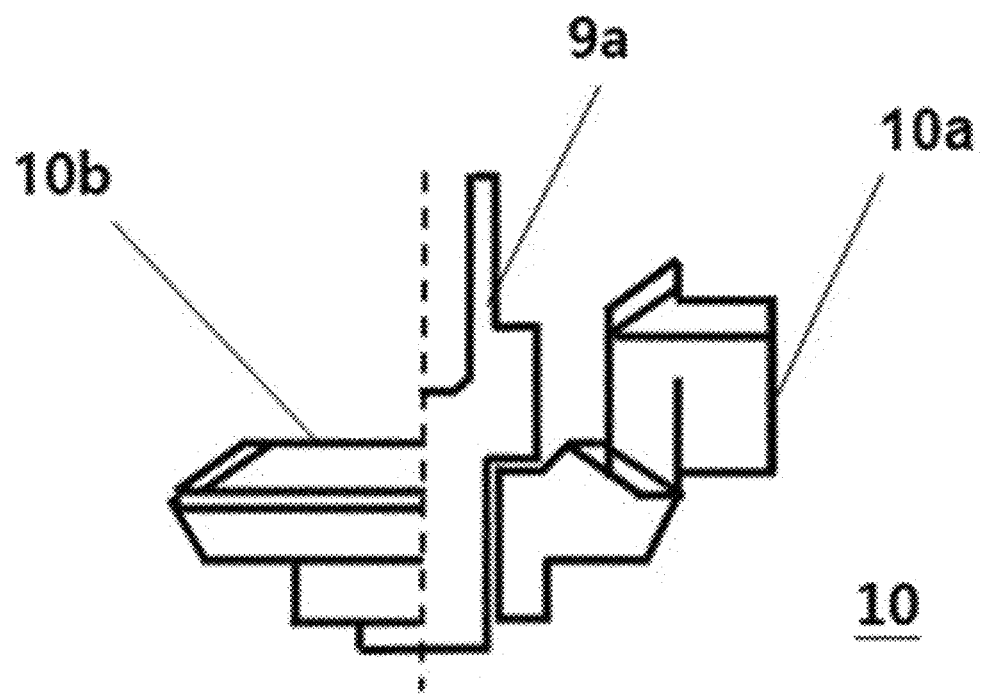
Figure 2I:
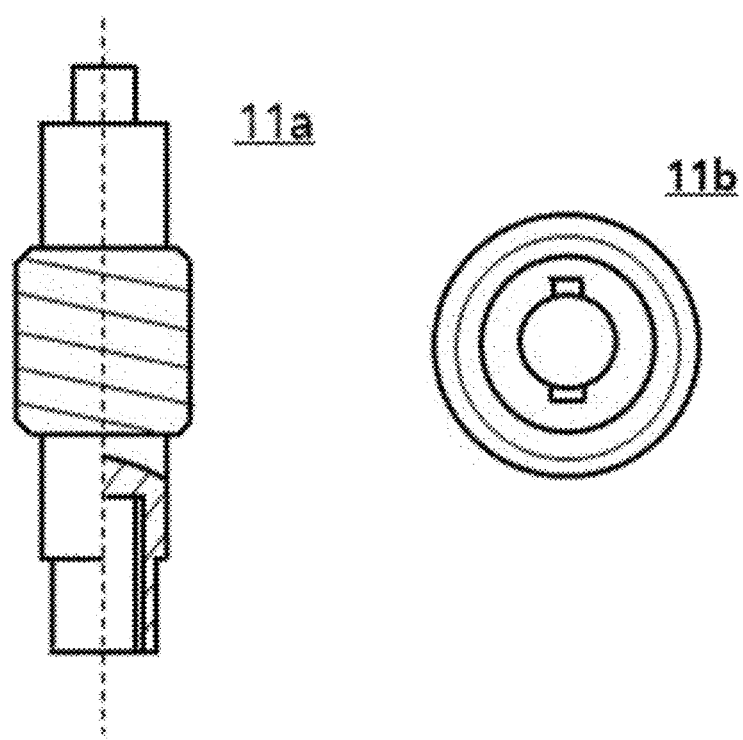
Figure 2J:
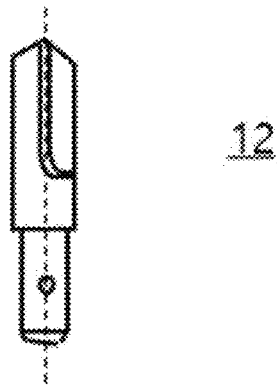
Figure 2K:
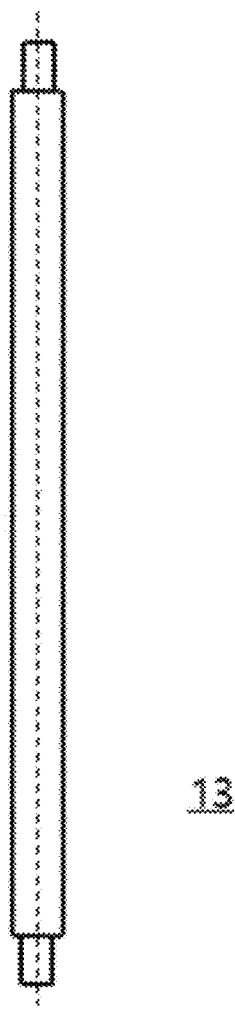
Figure 2L:
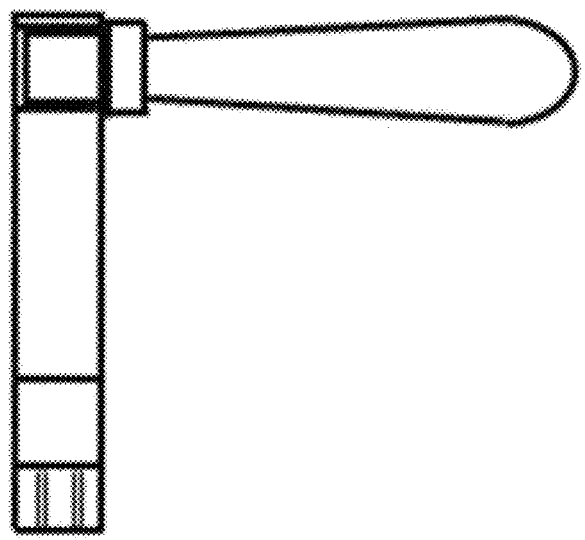
Figure 2M:
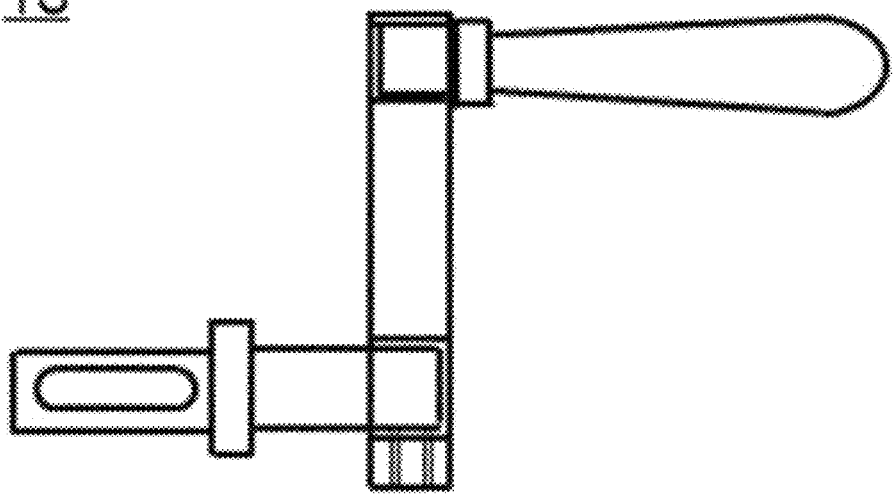

FIG. 1B illustrates a diagram showing the gear box 1 and components installed in the gear box 1, viewed in an arrow direction based on a line X-X' of FIG. 1A. The gear box 1 may include the bevel gear shaft 9a, the first bevel gear member 10a, the second bevel gear member 10b, a bevel gear cover 16, the bevel gear handle 17, the first worm gear member 11a, the second worm gear member 11b, a worm gear cover 15, the worm gear handle 18, ball bearings 21, 22, and 23, and so on, which are installed in the gear box 1.

FIGS. 2A to 2M are diagrams showing the gear box 1, the body casing 2, the upper casing member 3, the lower casing member 4, the sleeve 5, the drill shaft 8, the screw 9, the bevel gear shaft 9a, the bevel gear shaft 9a and the bevel gear members 10a and 10b, the worm gear 11a and 11b, the drill blade 12, the shaft guide 13, the bevel gear handle 17, the worm gear handle 18 of the drill apparatus 100 according to the present invention, respectively. Like in FIG. 1A, a right portion is an internal cross-sectional view and a left is a front view, based on a dotted line of the center.

Figure 3A:
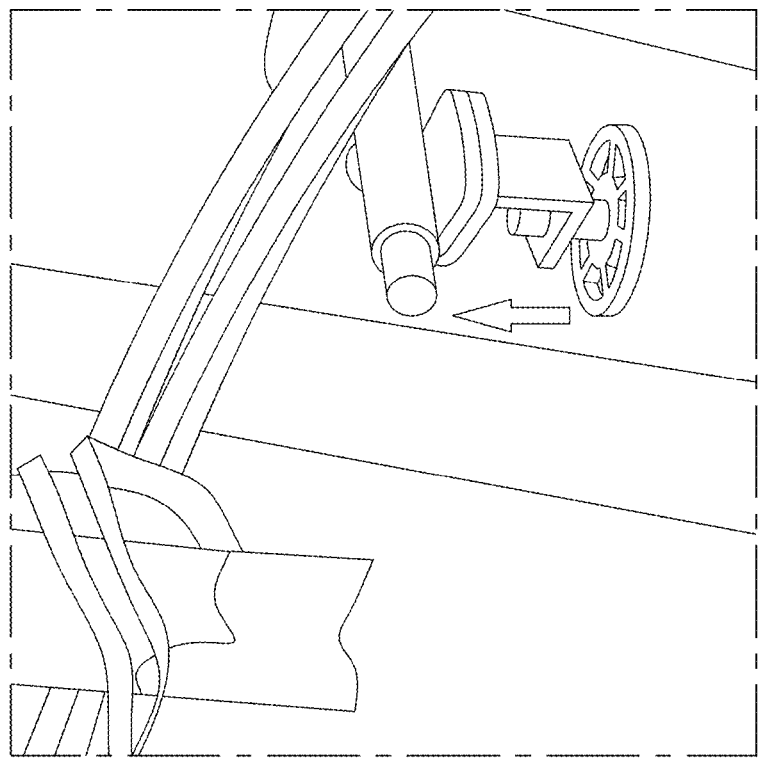
FIGS. 3A to 3B are images of an environment of an exemplary process apparatus to which a drill apparatus is coupled and used according to the present invention.
Figure 3B:
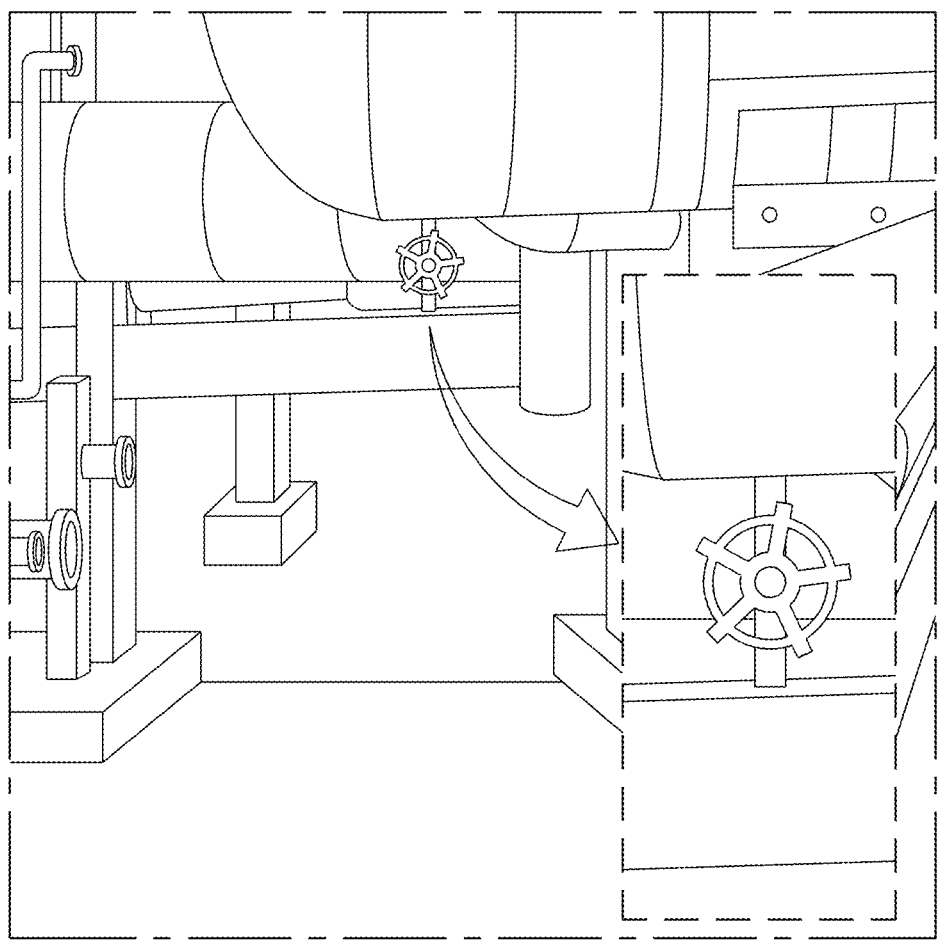

FIGS. 3A to 3B are images of an exemplary process apparatus in which the drill apparatus 100 is used according to the present invention. FIG. 3A is a front image of exemplary process apparatus in which the drill apparatus 100 is used according to the present invention. An image in a box of FIG. 3A is formed by enlarging, particularly, a portion to which the drill apparatus 100 according to the present invention is to be coupled as a portion in which plugging frequently occurs. FIG. 3B is an image of a portion of the process apparatus shown in FIG. 3A, viewed from the below. A portion indicated by an arrow in FIG. 3B may be clogged by a tap as shown in the drawing.

FIG. 4A is an image showing the drill apparatus 100 according to the present invention. The upper casing member connection pipe 41a and the valve 41b may be connected to the opening 3b of the upper casing member 3. An operator may first connect a nitrogen gas supply unit (not shown) to the upper casing member connection pipe 41a through a tube, a pipe, or the like, and then, may open the valve 41b to break the plugging in the pipe while supplying nitrogen gas to an internal space defined by the upper casing member 3 and the drill blade 12. Accordingly, even if a spark occurs on the drill blade 12 while the plugging is broken, nitrogen gas may be supplied, and thus, explosion or fire due to a spark may be prevented. In addition, to discharge plugging in the upper casing member 3, the valve 41b may be closed and the tube or pipe connected to the nitrogen gas supply unit may be removed, and then, another tube or pipe may be connected to the upper casing member connection pipe 41a, and thus, plugging in the upper casing member 3 may be externally discharged through the upper casing member connection pipe 41a, as described above. A handle 42 may be attached to the drill apparatus 100. The drill apparatus 100 may include the bevel gear handle 17 and the worm gear handle 18, and as described above, the bevel gear handle 17 may adjust the up-and-down motion of the drill blade 12, and the worm gear handle 18 may adjust a rotation motion of the drill blade 12.

Figure 4B:
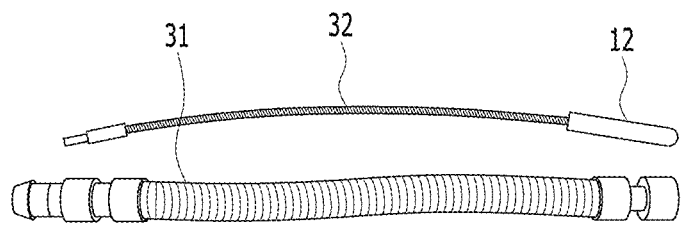
FIG. 4B is an image of a flexible high-pressure hose and a flexible wire, to be coupled to the drill apparatus of FIG. 4A, and FIGS. 4C and 4D are images of a drill apparatus according to another embodiment and still another embodiment of the present invention, respectively.
Figure 4C:
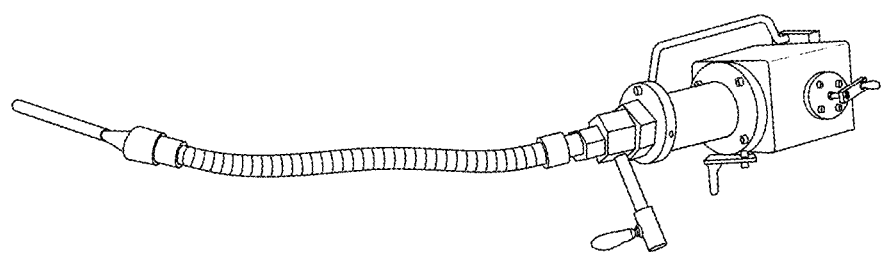
Figure 4D:
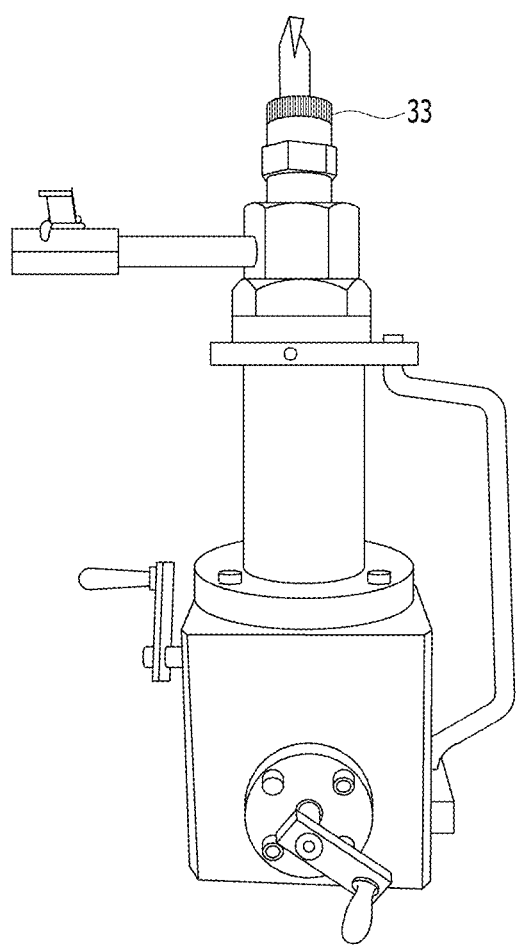

FIG. 4B is an image of the flexible high-pressure hose 31 and a flexible wire 32, which are installed in the drill apparatus 100 according to the present invention. The flexible high-pressure hose 31 may be coupled to the groove 3a of the upper casing member 3 of the drill apparatus 100 of FIG. 1A, and one end portion of the flexible wire 32 may be coupled to the second part 8b of the drill shaft 8. The drill blade 12 may be coupled to the other end portion of the flexible wire 32. The flexible wire 32 to which the drill blade 12 is connected may be surrounded by the flexible high-pressure hose 31. FIG. 4C is an image showing the case in which the flexible high-pressure hose 31 and the flexible wire 32 are coupled to the drill apparatus 100 according to the present invention. FIG. 4D is an image showing the case in which the drill apparatus 100 according to the present invention includes the nipple 33. As described above, the nipple 33 may be coupled to the groove 3a of the upper casing member 3. As necessary, depending on a process environment in which the drill apparatus 100 according to the present invention is embodied, the flexible high-pressure hose 31 may be exchanged with the nipple 33, and then, an operator may work on an operation. That is, the flexible high-pressure hose 31 and the flexible wire 32 which are coupled to the upper casing member of the drill apparatus 100 according to the present invention may be removed, the drill blade 12 may be connected directly to the second part 8b of the drill shaft 8, the nipple 33 may be coupled to the groove 3a of the upper casing member 3, and then, an operator may work on an operation.

Referring back to FIG. 3B, when plugging occurs in a process apparatus and needs to be removed, a tap may be capable of being open. When the tap is open, there may be a portion shaped like a female thread such that the drill apparatus 100 according to the present invention is coupled to the portion (not shown). The flexible high-pressure hose 31 of the drill apparatus 100 of FIG. 4B and the nipple 33 of the drill apparatus 100 according to the present invention of FIG. 4D have respective end portions shaped like a male thread, and thus, the end portions may be coupled to the portion shaped like a female thread in the process apparatus of FIG. 3B. Accordingly, for example, in the case of the drill apparatus 100 according to the present invention of FIG. 4D, the drill apparatus 100 may be coupled to a lower portion of the process apparatus of FIG. 3B in a longitudinal direction. When the drill apparatus 100 according to the present invention is fixedly coupled to the process apparatus, the valve shown in FIG. 3B may be turned. When the valve is turned, the pipe may be open to allow the drill blade 12 of the drill apparatus 100 to be moved into the pipe of the process apparatus. As shown in FIG. 1A, the bevel gear handle 17 of the drill apparatus 100 may be turned to move the drill blade 12 forward to be positioned in plugging, and the worm gear handle 18 may be turned to rotate a drill blade, thereby breaking plugging.

Referring back to FIG. 4B, the flexible wire 32 to which the drill blade 12 is connected and the flexible high-pressure hose 31 may be coupled to one end portion of the drill apparatus 100, and thus, the drill apparatus 100 may also be coupled to the process apparatus even in a narrow space for positioning the drill apparatus 100 therein, for example, a space with a height equal to or less than 200 mm to a bottom from the lower end portion of the process apparatus, and accordingly, an operator advantageously and easily work an operation. The flexible high-pressure hose 31 may endure with a maximum pressure of 30 Bar and at a maximum temperature of 200□ and may be formed of, for example, a stainless steel material. The flexible wire 32 may be formed of, for example, a stainless steel material. A small groove may be disposed in one end portion of the flexible wire 32, and the convex portion may be disposed on the drill blade 12, and thus, the flexible wire 32 may be fixed to the drill blade 12. Similarly, a small groove may also be disposed in the second part 8b of the drill shaft 8, and a convex portion may be disposed on the other end portion of the flexible wire 32, and thus, the flexible wire 32 may be embodied to be fixed to the drill shaft 8. Accordingly, even if the worm gear handle 18 is turned to rotate the drill shaft 8 and the flexible wire 32 to which the drill blade 12 is connected is rotated in conjunction with the drill shaft 8, an operator may stably work on an operation without separation of the drill blade 12 or the flexible wire 32 from the drill apparatus 100.

The drill blade 12 may be formed and embodied of a bronze material. Accordingly, the drill blade 12 is formed of a bronze material, and thus, even if an operator works on an operation in a state in which combustible gas or liquid remains in a pipe, a spark may be prevented from occurring, and thus, the risk of fire or explosion may be largely reduced. Plugging deposited in the process apparatus is solid but has lower strength than a pipe formed of steel, and thus, plugging may be broken via rotation of the drill blade 12 while not damaging the pipe.

Referring back to FIGS. 4A and 4D, the handle 42 may be disposed on the outer surface of the drill apparatus 100. The bevel gear handle 17 and the worm gear handle 18 may be disposed on the drill apparatus 100 according to the present invention. Accordingly, an operator may perform an operation of removing plugging while holding the handle 42 with one hand and manipulating the bevel gear handle 17 or the worm gear handle 18 with the other hand. Alternatively, the operator may perform the operation while holding the bevel gear handle 17 with one hand and holding the worm gear handle 18 with the other hand.

Although the present invention has been described with reference to preferred embodiments thereof, the scope of the present invention is not limited thereto, and specific portions of the contents of the present invention have been described in detail. Thus, it will be apparent to those skilled in the art that these specific descriptions are merely preferred embodiments and that the scope of the invention is not limited thereto. Therefore, the substantial scope of the present invention is defined by the accompanying claims and equivalents thereof.

100: drill apparatus
2: body casing
3: upper casing member
3b: opening
5: sleeve
1: gear box
2a: ball bearing
3a: groove
4: lower casing member
6: packing nut -continued

| | |
|---|---|
| 7: V packing | 8: drill shaft |
| 8a: first part of drill shaft | |
| 8b: second part of drill shaft | |
| 9: screw | 9a: bevel gear shaft |
| 10: bevel gear | 10a: first bevel gear member |
| 10b: second bevel gear member | 11: worm gear |
| 11a: first worm gear member | |
| 11b: second worm gear member | |
| 12: drill blade | 13: shaft guide |
| 14: fixing plate | 15: worm gear cover |
| 16: bevel gear cover | 17: bevel gear handle |
| 18: worm gear handle | 21, 22, 23: ball bearing |
| 31: flexible high-pressure hose | |
| 32: flexible wire | |
| 33: nipple | 41a: upper casing member connection pipe |
| 41b: valve | 42: handle |

The invention claimed is:

1. A drill apparatus for removing plugging in a pipe, the drill apparatus comprising:
a drill blade for breaking the plugging in the pipe;
a bevel gear and a bevel gear handle for adjusting an up-and-down motion of the drill blade;
a worm gear and a worm gear handle for adjusting a rotation motion of the drill blade;
a screw positioned on a same axis line as the drill blade and having an outer surface shaped like a male thread;
a drill shaft including a first part surrounding the screw and a second part with the drill blade fixed thereto, an internal surface of the first part being shaped like a female thread such that the drill shaft is engagable with the male thread of the screw; and
a shaft guide surrounding the first part of the drill shaft and in contact with the drill shaft.

2. The drill apparatus of claim 1, wherein:
the bevel gear includes a first bevel gear member coupled to the bevel gear handle, and a second bevel gear member engaged with the first bevel gear member;
the drill apparatus further includes a bevel gear shaft for connecting the second bevel gear member and a lower end portion of the screw;
wherein, by rotation of the bevel gear handle, the first bevel gear member is rotated, the second bevel gear member is engaged with the first bevel gear member and is rotated, the bevel gear shaft coupled to the second bevel gear member is rotated, and the screw coupled to the bevel gear shaft is rotated; and
wherein, by rotation of the screw, the female thread of the internal surface of the drill shaft is engaged with the male thread of the outer surface of the screw, the drill shaft is moved in an up and down direction while being rotated, and the drill blade fixed to the drill shaft is moved in an up and down direction.

3. The drill apparatus of claim 1, wherein:
the worm gear includes a first worm gear member coupled to the worm gear handle, and a second worm gear member engaged with the first worm gear member;
the drill apparatus further includes a fixing plate connected to a lower portion of the shaft guide and contacting the second worm gear member; and
wherein, by rotation of the worm gear handle in a first direction, the first and second worm gear members are rotated in the first direction the fixing plate contacts the second worm gear member and is rotated in the first direction, the shaft guide coupled to the fixing plate is rotated in the first direction, the drill shaft contacts the shaft guide is rotated in the first direction, and the drill blade fixed to the drill shaft is rotated in first direction.

4. The drill apparatus of claim 3, wherein the second worm gear member is moved away from the fixing plate by rotation of the worm gear handle in a second direction opposite to the first direction, and only power front rotation of the bevel gear handle is transferred to the drill shaft.

5. The drill apparatus of claim 1, wherein the drill blade is formed of a bronze material.

6. The drill apparatus of claim 1, further comprising:
a body casing surrounding the shaft guide; and
an upper casing member for containing plugging that falls downward when removed by the drill blade, wherein the upper casing member is coupled to the body casing.

7. The drill apparatus of claim 6, further comprising a flexible wire for connecting the drill blade and the second part of the drill shaft; and
a flexible high-pressure hose for connecting the upper casing member and the pipe, wherein the flexible high-pressure hose surrounds the flexible wire, and
wherein plugging in the pipe is easily removed even in a narrow space via the flexible high-pressure hose and the flexible wire.

8. The drill apparatus of claim 6, further comprising a V packing and a packing nut positioned in the upper casing member and surrounding the second part of the drill shaft,
wherein when the drill blade is moved, an upper portion of the body casing is sealed by compressing the V packing via the packing nut to prevent the plugging contained in the upper casing member from moving into the body casing.

9. The drill apparatus of claim 6, wherein:
the upper casing member includes an opening disposed in a lateral surface thereof, and an upper casing member connection pipe and a valve connected to the opening; and
nitrogen gas is supplied into the upper casing member through the upper casing member connection pipe to prevent fire or explosion due to a spark when plugging is broken by the drill blade, or
the plugging in the upper casing member is externally discharged through the upper casing member connection pipe.

10. The drill apparatus of claim 7, wherein the flexible high-pressure hose is replaceable with a nipple, wherein the nipple connects the drill apparatus and the pipe, and the drill blade is connectable directly to the second part of the drill shaft without the flexible wire.

* * * * *